UNITED STATES PATENT OFFICE.

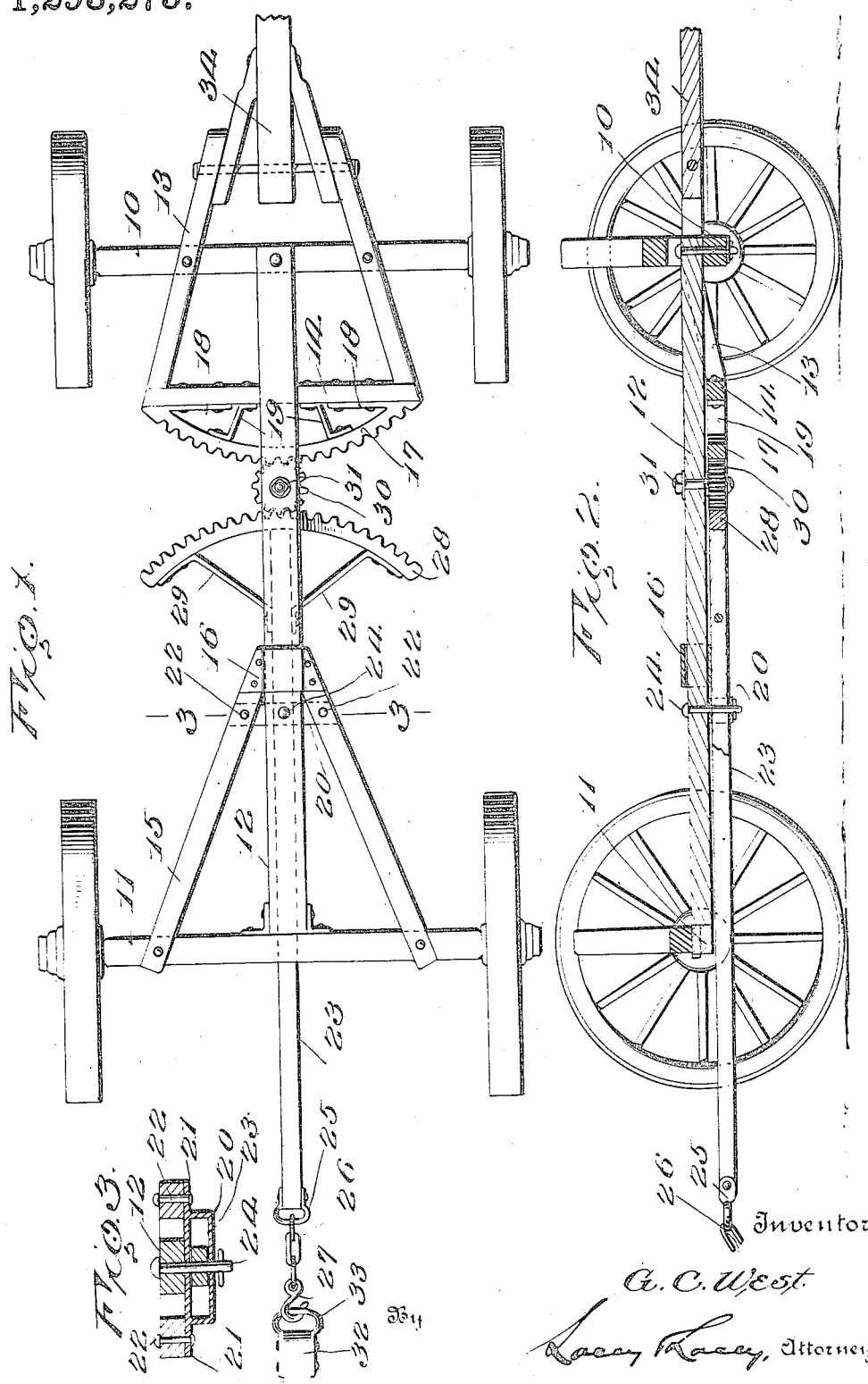

GLEN C. WEST, OF ASHKUM, ILLINOIS.

TRAILER-COUPLING FOR WAGONS.

1,293,275.  Specification of Letters Patent.  Patented Feb. 4, 1919.

Application filed May 28, 1918. Serial No. 237,015.

*To all whom it may concern:*

Be it known that I, GLEN C. WEST, a citizen of the United States, residing at Ashkum, in the county of Iroquois and State of Illinois, have invented certain new and useful Improvements in Trailer-Couplings for Wagons, of which the following is a specification.

This invention relates to a trailer coupling for wagons and the like and has as its primary object to provide a construction wherein a wagon being trailed will be guided from the wagon leading to follow in the path of the leading wagon.

The invention has as a further object to provide a coupling adapted for connection with the tongue of a wagon to be trailed and wherein the swinging of the tongue of the wagon leading in either direction will cause the tongue of the wagon being trailed to be swung in the opposite direction for thus properly guiding the wagon being trailed in the path of the wagon leading.

And the invention has as a still further object to provide a coupling which may be readily employed in connection with substantially any conventional type of farm wagon.

Other and incidental objects will appear as the description proceeds. In the drawings wherein I have illustrated the preferred embodiment of the invention, and wherein similar reference characters designate corresponding parts throughout the several views:

Figure 1 is a plan view showing my improved trailer coupling in connection with a conventional type of farm wagon, Fig. 2 is a longitudinal sectional view more particularly illustrating the mounting of the coupling upon the wagon, and Fig. 3 is a transverse sectional view taken on the line 3—3 of Fig. 1, and particularly showing the bearing keeper for the coupling arm of the device.

Referring more particularly to the drawings, I have shown my improved coupling in connection with a conventional type of farm wagon including front and rear axles 10 and 11 respectively, which are joined by the reach pole 12. Secured to the front axle 10 are the front hounds 13 connected at their inner extremities by a cross bar 14. Secured to the rear axle 11 are the rear hounds 15 joined at their inner extremities by a guide 16 receiving the reach pole therethrough.

Coming now more particularly to the subject of the present invention, I employ a fixed segmental rack bar 17 provided at its ends with laterally and inwardly directed attaching lugs 18. These lugs seat flat against the inner edge of the cross bar 14 for the front hounds of the wagon and are connected with the said cross bar by bolts or other suitable fastening devices for thus rigidly securing the rack bar upon the said cross bar to lie in a plane therewith beneath the reach pole. Bracing the rack bar intermediate of its ends with respect to the cross bar 14 are suitable braces 19. Mounted to extend transversely between the inner ends of the rear hounds 15 of the wagon, is a bearing guide 20 in the nature of a rectangular frame provided at its upper corners with laterally directed lugs 21 seating beneath the said hounds and connected therewith by bolts or other suitable fastening devices 22. Extending through this bearing guide and journaled thereon is a coupling arm 23 pivoted upon the guide by a pin 24 extending through the reach pole 12 of the wagon, through the frame of the said guide and through the said coupling arm. This pin may be secured in any approved manner as by a cotter pin. The coupling arm is thus mounted to rock within the bearing guide and at its rear extremity projects beyond the rear wheels of the wagon and is preferably equipped at its outer end with a clip 25 to which is connected a chain 26 carrying a suitable hook 27. Mounted upon the inner end of the said arm is a segmental rack bar 28 supported at its ends with respect to the bar by suitable brace members 29. Journaled between the rack bars 17 and 28 and coöperating therewith is a pinion 30 supported beneath the reach pole 12 of the wagon by a stub shaft or bolt 31 extending through the said pole. Thus it will be seen that when the front hounds 13 of the wagon are swung in one direction, the pinion 30 will be rotated to swing the outer extremity of the coupling arm 23 in the opposite direction.

In use the hook 27 of the chain 26 at the outer end of the coupling arm 23 of my improved coupling is engaged with the outer end of the tongue of the wagon to be trailed and in Fig. 1 of the drawings, I have conventionally shown a portion of the tongue of such wagon at 32, the hook 27 being engaged within the clip 33 carried by the outer terminal of the said tongue. Assuming now that the tongue of the wagon leading, which tongue has, for convenience, been indicated by the numeral 34, is swung to the right, the outer end of the coupling arm 23 will be swung to the left so that the tongue 32 of the wagon being trailed will accordingly also be swung to the left for directing the wagon being trailed around the curved course taken by the wagon leading or in the path of the leading wagon. On the other hand, should the tongue 34 be swung to the left, the outer end of the coupling arm 23 will then be swung to the right for accordingly also swinging the tongue 32 of the wagon being trailed to the right. In this latter instance, the wagon being trailed would thus also be directed in the path of the leading wagon. I, therefore, provide a particularly efficient type of trailer coupling and, as will be seen, a construction which may be employed in connection with substantially any conventional type of farm wagon. However, I do not wish to be limited in this regard as my improved coupling may also be used with equally effective results upon various other kinds of road vehicles.

Having thus described the invention, what is claimed as new is:

1. The combination with a vehicle having front hounds mounted to swing with the front axle of the vehicle, and a reach pole, of a trailer coupling for the vehicle including a segmental rack bar connected with the front hounds of the vehicle, a coupling arm pivoted upon the said reach pole, a segmental rack bar carried by the said arm, and means between the said rack bars and coacting therewith for swinging the coupling arm from the front hounds of the vehicle.

2. The combination with a vehicle having front hounds mounted to swing with the front axle of the vehicle, and a reach pole, of a trailer coupling for the vehicle including a segmental rack bar connected with the said hounds, a coupling arm mounted to swing with respect to the reach pole, a segmental rack bar carried by the said arm, and a pinion connected with the reach pole and interposed between the said rack bars to coact therewith for swinging the coupling arm from the front hounds of the vehicle.

3. The combination with a vehicle having front hounds mounted to swing with the front axle of the vehicle, rear hounds, and a reach pole, of a trailer coupling for the vehicle including a segmental rack bar connected with the front hounds of the vehicle, a bearing guide mounted upon the rear hounds of the vehicle, a coupling arm received through said guide, a pivot pin extending through the guide and the said arm and supporting the arm to swing within the guide, a segmental rack bar carried by the said arm, and a pinion supported from the reach pole between said rack bars to coact therewith for swinging the coupling arm from the front hounds of the vehicle.

4. The combination with a vehicle having front wheels adapted to be swung for guiding the vehicle, of a trailer coupling for the vehicle including a coupling arm pivoted upon the vehicle, a rack bar operatively connected with the front wheels of the vehicle to be swung therewith, a rack bar carried by the forward end of said arm, and means between the rack bars and coacting therewith for swinging the coupling arm coincident with the movement of the front wheels of the vehicle.

5. The combination with a vehicle having front wheels adapted to be swung for guiding the vehicle, of a trailer coupling for the vehicle including a coupling arm pivoted upon the vehicle, and a gear connection operatively coupling the front wheels of the vehicle with said arm for swinging the arm coincident with the movement of said wheels.

In testimony whereof, I affix my signature.

GLEN C. WEST. [L. S.]